(12) United States Patent
Rechterman

(10) Patent No.: US 8,275,868 B2
(45) Date of Patent: *Sep. 25, 2012

(54) SYSTEMS FOR PROVIDING CUSTOMER-SELECTED SOLUTIONS FOR MULTIPLE DATACENTER WEBSITE HOSTING

(75) Inventor: Barbara Rechterman, Cave Creek, AZ (US)

(73) Assignee: Go Daddy Operating Company, LLC, Scottsdale, AZ (US)

(*) Notice: Subject to any disclaimer, the term of this patent is extended or adjusted under 35 U.S.C. 154(b) by 540 days.

This patent is subject to a terminal disclaimer.

(21) Appl. No.: 12/367,990

(22) Filed: Feb. 9, 2009

(65) Prior Publication Data
US 2010/0205286 A1  Aug. 12, 2010

(51) Int. Cl.
*G06F 15/173* (2006.01)
(52) U.S. Cl. ......................................... 709/223; 709/224
(58) Field of Classification Search .................... 709/223
See application file for complete search history.

(56) References Cited

U.S. PATENT DOCUMENTS

| | | |
|---|---|---|
| 6,654,804 B1 | 11/2003 | Fleming |
| 6,789,103 B1 | 9/2004 | Kim et al. |
| 6,842,769 B1 | 1/2005 | Kim et al. |
| 6,868,444 B1 | 3/2005 | Kim et al. |
| 7,188,138 B1 | 3/2007 | Schneider |
| 2002/0087643 A1* | 7/2002 | Parsons et al. ................. 709/206 |
| 2003/0069948 A1* | 4/2003 | Ma et al. ........................ 709/220 |
| 2005/0021863 A1* | 1/2005 | Jungck ........................... 709/246 |
| 2006/0139312 A1 | 6/2006 | Sinclair et al. |
| 2007/0198946 A1* | 8/2007 | Viji et al. ....................... 715/779 |
| 2008/0147856 A1 | 6/2008 | Lee et al. |
| 2008/0201410 A1 | 8/2008 | Adelman et al. |
| 2008/0201421 A1 | 8/2008 | Adelman et al. |
| 2008/0201466 A1* | 8/2008 | Adelman et al. .............. 709/224 |
| 2008/0201473 A1 | 8/2008 | Adelman et al. |
| 2008/0243536 A1 | 10/2008 | Dworkin et al. |
| 2008/0243634 A1 | 10/2008 | Dworkin et al. |

OTHER PUBLICATIONS

U.S. Appl. No. 12/140,450.
Sep. 16, 2010 non-final office action in related U.S. Appl. No. 12/367,972.
Nov. 2, 2010 response to Sep. 16, 2010 non-final office action in related U.S. Appl. No. 12/367,972.
Feb. 24, 2012 Notice of Allowance in related U.S. Appl. No. 13/039,488.
Nov. 10, 2011 office action in related U.S. Appl. No. 13/039,488.
Feb. 6, 2012 response to Nov. 10, 2011 office action in related U.S. Appl. No. 13/039,488.

* cited by examiner

*Primary Examiner* — Quang N Nguyen
*Assistant Examiner* — Andrew Woo
(74) *Attorney, Agent, or Firm* — Karl A. Fazio

(57) ABSTRACT

Systems of the present inventions allow for providing customer-selected solutions for multiple datacenter website hosting. An exemplary system may comprise a first datacenter comprising at least one hosting server, a second datacenter comprising at least one hosting server, and a hosting services website hosted on at least one customer interaction server. The hosting services website may be configured to offer and implement hosting of at least one customer website in the first datacenter, second datacenter, or both the first datacenter and second datacenter. The system also may comprise a network communicatively coupling the first datacenter, second datacenter, and customer interaction server.

16 Claims, 12 Drawing Sheets

SYSTEMS FOR PROVIDING CUSTOMER-SELECTED SOLUTIONS FOR MULTIPLE DATACENTER WEBSITE HOSTING

CROSS REFERENCE TO RELATED PATENT APPLICATIONS

This patent application is related to U.S. patent application Ser. No. 12/367,972 entitled: "Providing Customer-Selected Solutions for Multiple Datacenter Website Hosting" concurrently filed herewith and also assigned to The Go Daddy Group, Inc.

FIELD OF THE INVENTION

The present inventions generally relate to the field of website hosting and, more specifically, systems and methods for providing customer-selected solutions for multiple datacenter website hosting.

SUMMARY OF THE INVENTION

An example embodiment of a system for providing customer-selected solutions for multiple datacenter website hosting may comprise a first datacenter comprising at least one hosting server, a second datacenter comprising at least one hosting server, and a hosting services website hosted on at least one customer interaction server. The hosting services website may be configured to offer and implement hosting of at least one customer website in the first datacenter, second datacenter, or both the first datacenter and second datacenter. The system also may comprise a network communicatively coupling the first datacenter, second datacenter, and customer interaction server.

An example embodiment of a method for providing customer-selected solutions for multiple datacenter website hosting may comprise the steps of registering a domain name to a registrant, offering to host the registrant's website (that may resolve from the domain name) in a first datacenter, a second datacenter, or the first and second datacenter, provisioning (if the registrant selects hosting in both datacenters) hosting servers in both the first and second datacenter to host the customer website, and hosting the customer website on both provisioned servers.

The above features and advantages of the present inventions will be better understood from the following detailed description taken in conjunction with the accompanying drawings.

DETAILED DESCRIPTION

Figure 1:
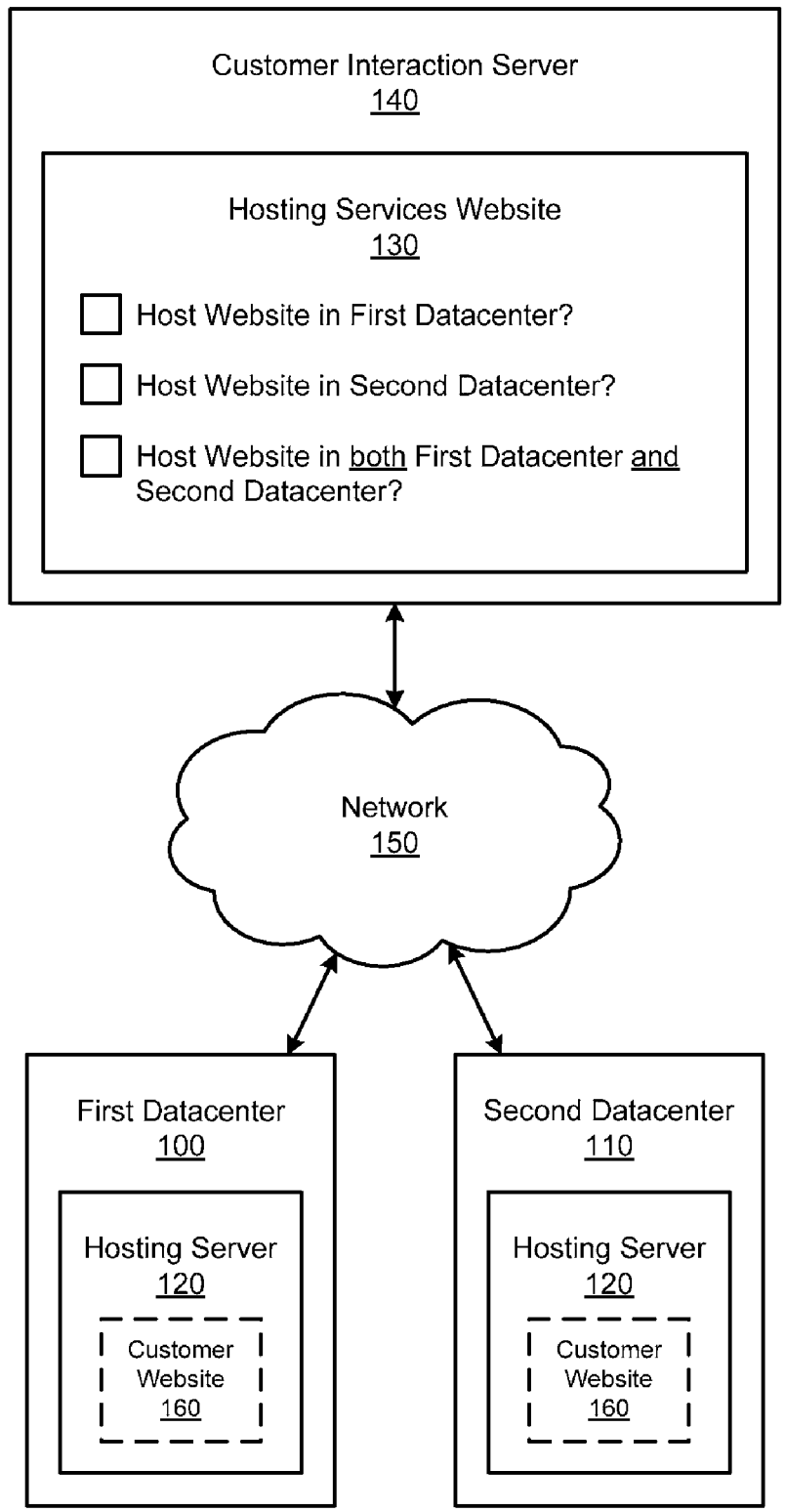
FIG. 1 illustrates a possible embodiment of a system for providing customer-selected solutions for multiple datacenter website hosting.

The present inventions will now be discussed in detail with regard to the attached drawing figures which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between computer users. Hundreds of millions of people around the world have access to computers connected to the Internet via Internet Service Providers (ISPs). Content providers place multimedia information (e.g., text, graphics, audio, video, animation, and other forms of data) at specific locations on the Internet referred to as webpages. Websites comprise a collection of connected or otherwise related webpages. The combination of all the websites and their corresponding webpages on the Internet is generally known as the World Wide Web (WWW) or simply the Web.

Prevalent on the Web are multimedia websites, some of which may offer and sell goods and services to individuals and organizations. Websites may consist of a single webpage, but typically consist of multiple interconnected and related webpages. Websites, unless extremely large and complex or have unusual traffic demands, typically reside on a single server and are prepared and maintained by a single individual or entity. Menus and links may be used to move between different webpages within the website or to move to a different website as is known in the art. The interconnectivity of webpages enabled by the Internet can make it difficult for Internet users to tell where one website ends and another begins.

Websites may be created using Hypertext Markup Language (HTML) to generate a standard set of tags that define how the webpages for the website are to be displayed. Users of the Internet may access content providers' websites using software known as an Internet browser, such as MICROSOFT INTERNET EXPLORER or MOZILLA FIREFOX. After the browser has located the desired webpage, it requests and receives information from the webpage, typically in the form of an HTML document, and then displays the webpage content for the user. The user then may view other webpages at the same website or move to an entirely different website using the browser.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC: BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

For Internet users and businesses alike, the Internet continues to be increasingly valuable. More people use the Web for everyday tasks, from social networking, shopping, banking, and paying bills to consuming media and entertainment. E-commerce is growing, with businesses delivering more services and content across the Internet, communicating and collaborating online, and inventing new ways to connect with each other.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting service providers typically provide the hardware, software, and electronic communication means necessary to connect multiple websites to the Internet. A single hosting service provider may literally host thousands of websites on one or more hosting servers.

Hosting providers often sell website hosting services based upon the content provider's anticipated memory and bandwidth needs. For example, a content provider may pay a lower monthly fee for 100 gigabytes (GB) of server disk space and 1000 GB of bandwidth than another content provider whose website may require 500 GB and 5000 GB of server disk space and bandwidth, respectively. Content providers must carefully evaluate their website's anticipated storage and bandwidth needs and select their hosting plan accordingly. If they underestimate their needs, their website may become non-functional once their memory and/or bandwidth allotment is exceeded.

Similarly, content providers must carefully evaluate their hosting provider's ability to quickly return requested website content to their website users. One factor that contributes to content return speed is the physical proximity of the hosting provider's datacenters to anticipated website users. An Arizona-based business, for example, may have the majority of its customers (and therefore website users) located in Arizona. It may therefore prefer a hosting provider with Arizona-based datacenters to one with datacenters in Asia.

With the proliferation of the Internet as a mechanism of commerce, however, businesses are increasingly conducting online business across broad geographical boundaries. The small Arizona-based business, for example, may increasingly see website traffic from not just Arizona, but also New York, Europe, and Asia. Other content providers, such as individuals, also may be experiencing an increase in such extra-geographical website hits due to family and friends increasingly being dispersed throughout the world.

Ideally, hosting providers would offer content providers access to datacenters in multiple geographic locations to quickly return website content to their geographically-dispersed website users. Applicant, however, has determined that presently-existing website hosting systems and methods do not provide content providers with the ability to select the datacenter at which to host content, or the ability to select content hosting in multiple geographies. For the foregoing reasons, there is a need for the systems and methods for providing customer-selected solutions for multiple datacenter website hosting, and related functionality, as described herein.

Systems for Providing Customer-Selected Solutions for Multiple Datacenter Website Hosting FIG. 1 illustrates a possible embodiment of a system for providing customer-selected solutions for multiple datacenter website hosting. This example embodiment may comprise a first datacenter 100 (itself comprising at least one hosting server 120), a second datacenter 110 (also comprising at least one hosting server 120), and a hosting services website 130 hosted on at least one customer interaction server 140. The hosting services website 130 may be configured to offer and implement hosting of at least one customer website 160 in the first datacenter 100, second datacenter 110, or both the first datacenter 100 and second datacenter 110. A network 150 may communicatively couple the first datacenter 100, second datacenter 110, and customer interaction server 140.

The first datacenter 100 and/or the second datacenter 110 may comprise any mechanism for physically—or virtually—partitioning hosting servers 120 into a single, but interrelated computing center. As a non-limiting example, the first datacenter 100 and/or the second datacenter 110 may comprise a building or other location that stores servers and necessary related systems (e.g., additional computers, clients, telecommunication networks and equipment, data storage devices, power systems, security systems, environmental controls, switches, routers, load balancers, racks, and/or related equipment). The first datacenter 100 and/or the second datacenter 110 may be of any size and configuration. They may comprise a single server rack, or an entire building, depending on system needs. Alternatively, they may comprise a virtual datacenter, which may be defined as a highly-distributed collection of networked servers (perhaps connected communicatively via the network 150), which may perform the function of a traditional, physical datacenter. As yet another non-limiting example, a virtual datacenter may be implemented with a "cloud computing" solution.

Each of the at least one servers 120, the customer interaction server 140, and/or any other server described herein, could be any computer or program that provides services to other computers, programs, or users either in the same computer or over a computer network. As non-limiting examples, such servers could comprise an application, communication, mail, database, proxy, fax, file, media, web, peer-to-peer, or standalone server and may use any server format known in the art or developed in the future (possibly a shared hosting server, a virtual dedicated hosting server, a dedicated hosting server, or any combination thereof).

With a shared hosting server, many websites may reside on a single server. Each website may be stored in its own partition (i.e., section or place) on the server to keep it separate from other websites. Shared hosting servers are the most economical hosting option because numerous hosting customers may share in server maintenance cost. Virtual dedicated servers also may comprise a single server, but one that is partitioned into multiple (virtual) servers, each of which may have the appearance to the end user of being the users' own dedicated server. Such virtual dedicated servers may run their own operating system and be independently rebooted. Dedicated servers generally represent the most expensive website hosting option. With dedicated server hosting, the hosting customer may lease a complete server that is dedicated to that customer (i.e., not shared with others). This model may be more flexible than shared or virtual-dedicated hosting because customers may be provided complete control over the server, including the ability to customize its hardware, software, and/or operating system.

The example embodiments herein place no limitation on network 150 configurations or connectivity. Thus, as non-limiting examples, the network 150 could comprise the Internet, a public switched telephone network, a global Telex network, computer networks (e.g., an intranet, an extranet, a local-area network, or a wide-area network), wired networks, wireless networks, or any combination thereof. The network 150 also may comprise either a single network, or multiple interconnected networks. All system components described herein may be communicatively coupled to the network 150 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), WAN technologies (T1, Frame Relay), Point-to-Point Protocol over Ethernet (PPPoE), the Internet, and/or any combination thereof.

The customer interaction server 140 may host a hosting services website 130 accessible to content providers via the network 150. As illustrated in FIG. 1, the hosting services website 130 may be configured to offer and implement hosting of at least one customer website 160 in the first datacenter 100, second datacenter 110, or both the first datacenter 100 and second datacenter 110. The hosting services website 130 may offer such multi-geography hosting services via a plurality of software-enabled tools, perhaps comprising data fields, dialog boxes, drop-down menus, lists, etc., allowing the content provider to select a preferred datacenter, or multiple datacenters. Although FIG. 1 illustrates the customer interaction server 140 hosting the hosting services website 130, it alternatively may be hosted on any client or server communicatively coupled to the network 150.

The hosting services website 130 may be configured to implement customer website 160 hosting in the described datacenters (100 and/or 110) and may comprise any software and/or script that, when executed by a microprocessor on a client or server, may provision at least one hosting server 120 in the first datacenter 100, at least one hosting server 120 in the second datacenter 110, or both. Hosting servers 120 may be provisioned by any method of provisioning a hosting server 120 known in the art or developed in the future including, but not limited to imaging and/or scripting approaches, or any combination thereof. Server provisioning may be accomplished by configuring the server's hardware and/or software to meet the content provider's requirements. It may comprise installing the proper software (operating system, device drivers, middleware, applications, etc), configuring a boot image for the server, and perhaps booting the newly-configured server and its newly-installed software, thus making the system ready for operation. The DNS A-record for the subject domain name may be updated to reflect the IP address of the hosting server 120. Once the DNS A-record update (mapping the hosting server 120 to the domain name) propagates through the DNS, hosting service functionality may be fully enabled.

Where multiple hosting servers 120 are provisioned to simultaneously host a customer website 160, any load balancing solution known in the art or developed in the future may be utilized including, but not limited to, a "round robin" DNS method. Round robin DNS is a load distribution solution whereby multiple provisioned hosting servers 120 may be configured to respond to requests according to a predetermined statistical model. This method works by responding to requests with a list of IP addresses (rather than a single IP address) for several hosting servers 120. With each response, the IP address sequence in the list is changed. Because clients generally connect with the first IP address on the list, subsequent connection attempts may result in connection with a different hosting server 120, thus distributing the overall load.

Figure 2:
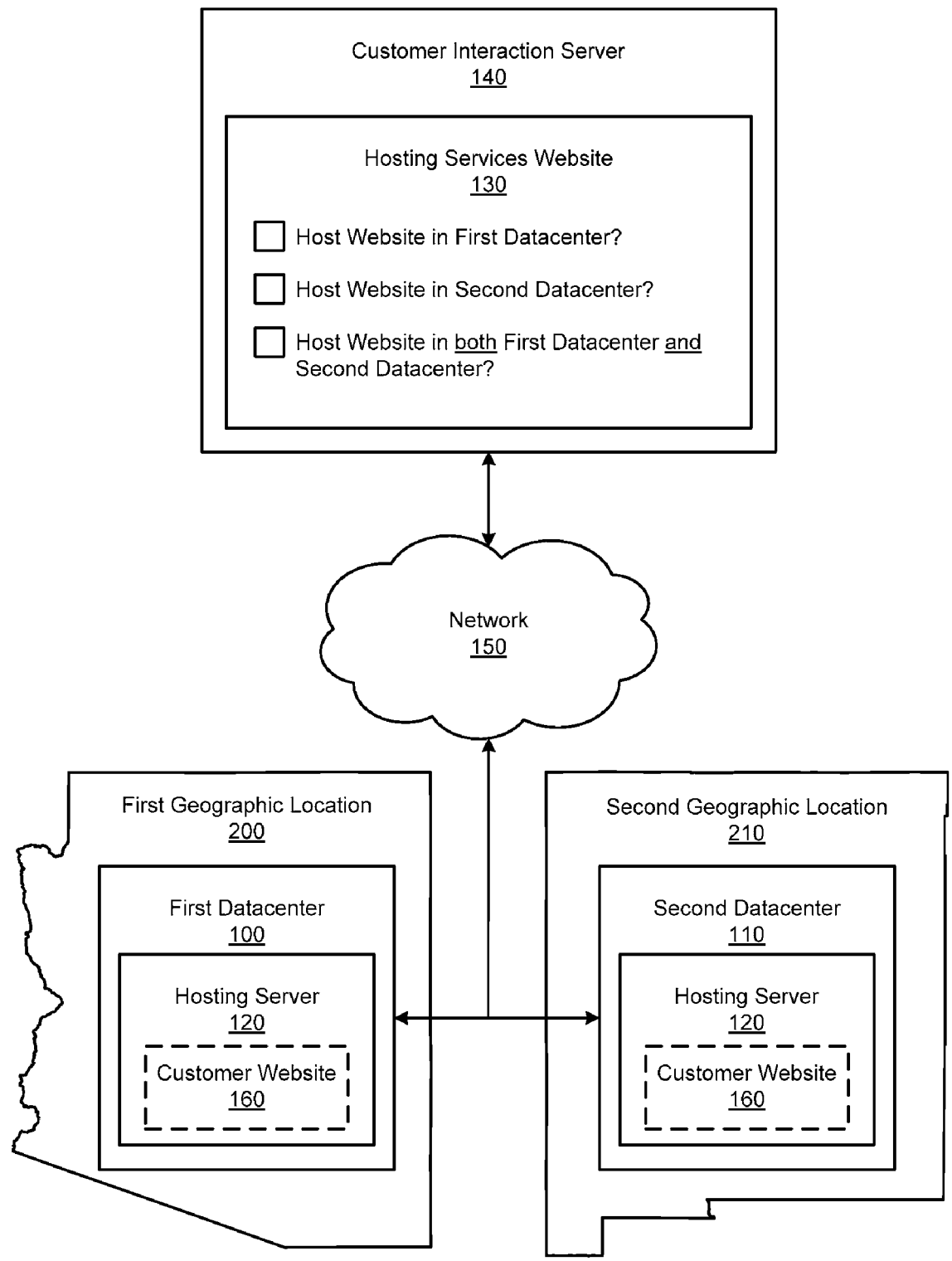
FIG. 2 illustrates a possible embodiment of a system for providing customer-selected solutions for multiple datacenter website hosting.

FIG. 2 illustrates an alternate possible embodiment of a system for providing customer-selected solutions for multiple datacenter website hosting, wherein the first datacenter 100 is located in a first geographic location 200 and the second datacenter 110 is located in a second geographic location 210. The first geographic location 200 may comprise any physical location that differs from the second geographic location 210. Any combination of first geographic 200 and second geographic location 210 may be used. As a non-limiting example, the first geographic location 200 may comprise North America and the second geographic location 210 may comprise Europe. Alternatively, the first geographic location 200 may comprise North America and the second geographic location 210 may comprise Asia.

Figure 3:
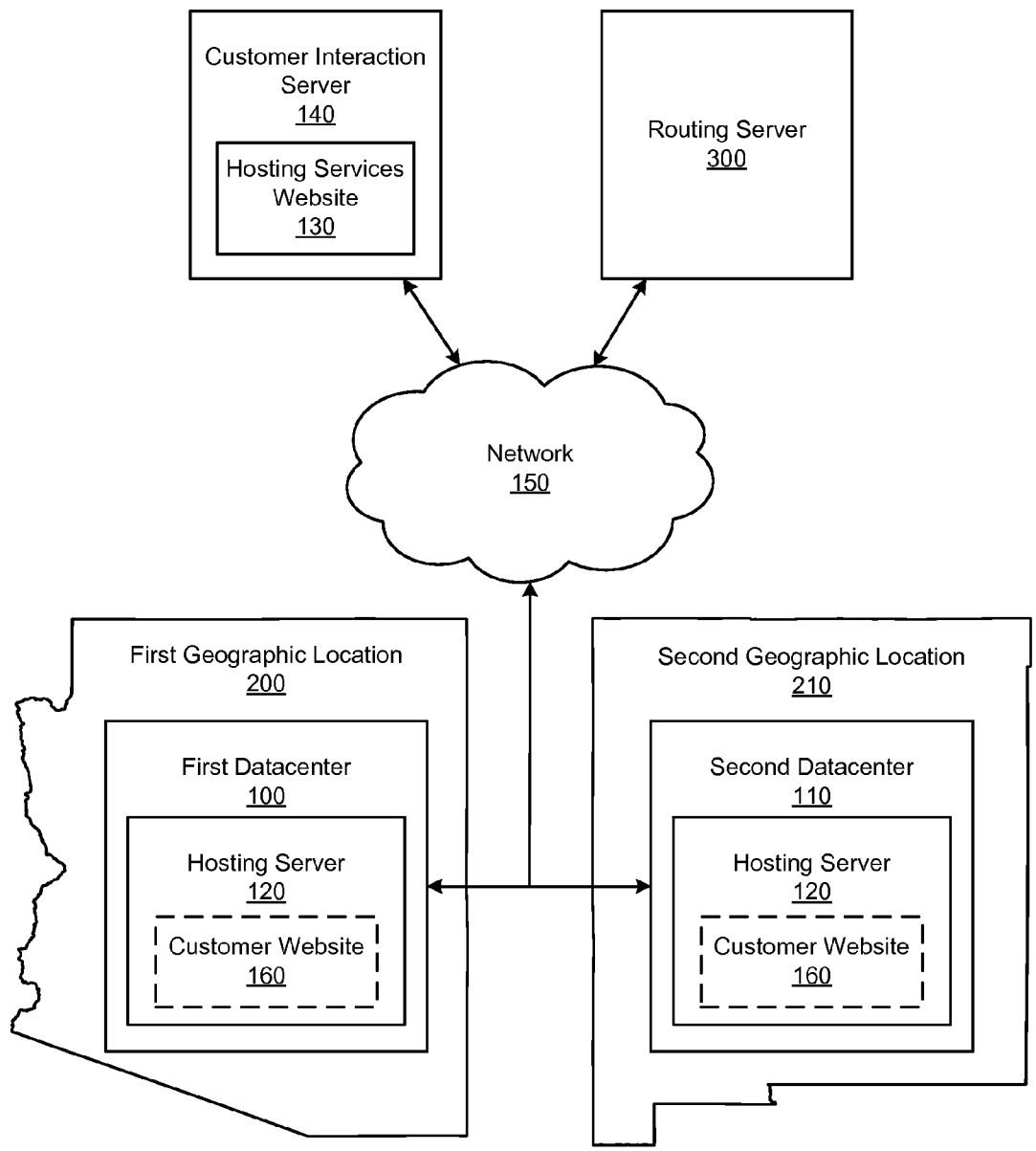
FIG. 3 illustrates a possible embodiment of a system for providing customer-selected solutions for multiple datacenter website hosting.

FIG. 3 illustrates another possible embodiment of a system for providing customer-selected solutions for multiple datacenter website hosting, wherein the system of FIG. 2 further comprises a routing server 300 communicatively coupled to the network 150. The routing server 300 may be configured to receive a request for content (the content being from at least one customer website 160), and route the request to the appropriate responding datacenter (either the first datacenter 100 or the second datacenter 110) by determining which of the datacenters may provide a faster response to the request.

The routing server 300 may comprise any of the server types described in detail above. It also may comprise any network router (or "switch") known in the art or developed in the future whose software and hardware may be tailored to the task of routing and forwarding information including, but not limited to, a provider edge router, subscriber edge router, inter-provider border router, core router, residential gateway, wired router, wireless router, and/or enterprise router. Any proprietary, open source, or commercially-available (e.g., CISCO's CRS-1 or CDS-IS CARRIER ROUTING SYSTEM) router may be utilized.

The routing server 300 may be configured by installing software and/or scripts that, when executed by a microprocessor on the routing server 300, cause the routing server 300 to receive an incoming request, determine which datacenter will provide the quickest response, and route the request to the appropriate server. The quickest response time may be a function of geographical proximity, and/or any other factor contributing to delay in response time, such as system demand. As a non-limiting example, installed software and/or scripts may accomplish this by determining the geographic origin of the request, determining whether the first datacenter 100 or second datacenter 110 is in closest physical proximity to the geographic origin of the request, and routing the request to the closest datacenter. The geographic origin of the request may be obtained by identifying the IP address of a client making an HTTP request (the IP address may be in the HTTP request itself) and comparing the IP address against one of the many available geolocation databases, such as those provided by GEOBYTES or IP2LOCATION.

The customer website 160 hosted in the hosting servers 120 in the datacenters (100 and 110) may comprise a single webpage or multiple interconnected and related webpages (i.e., a website) resolving from a domain name, each of which may provide access to multimedia content (e.g., text files, audio files, video files, graphics files, executable files, etc.). A customer website 160 hosted in the first datacenter 100 may comprise the same or different content than a customer website 160 hosted in the second datacenter 110. This may allow the content provider either to have the same content delivered irrespective of geography, or to tailor content based on the Internet user's location. For example, local datacenters may return content in a native language.

Figure 4:
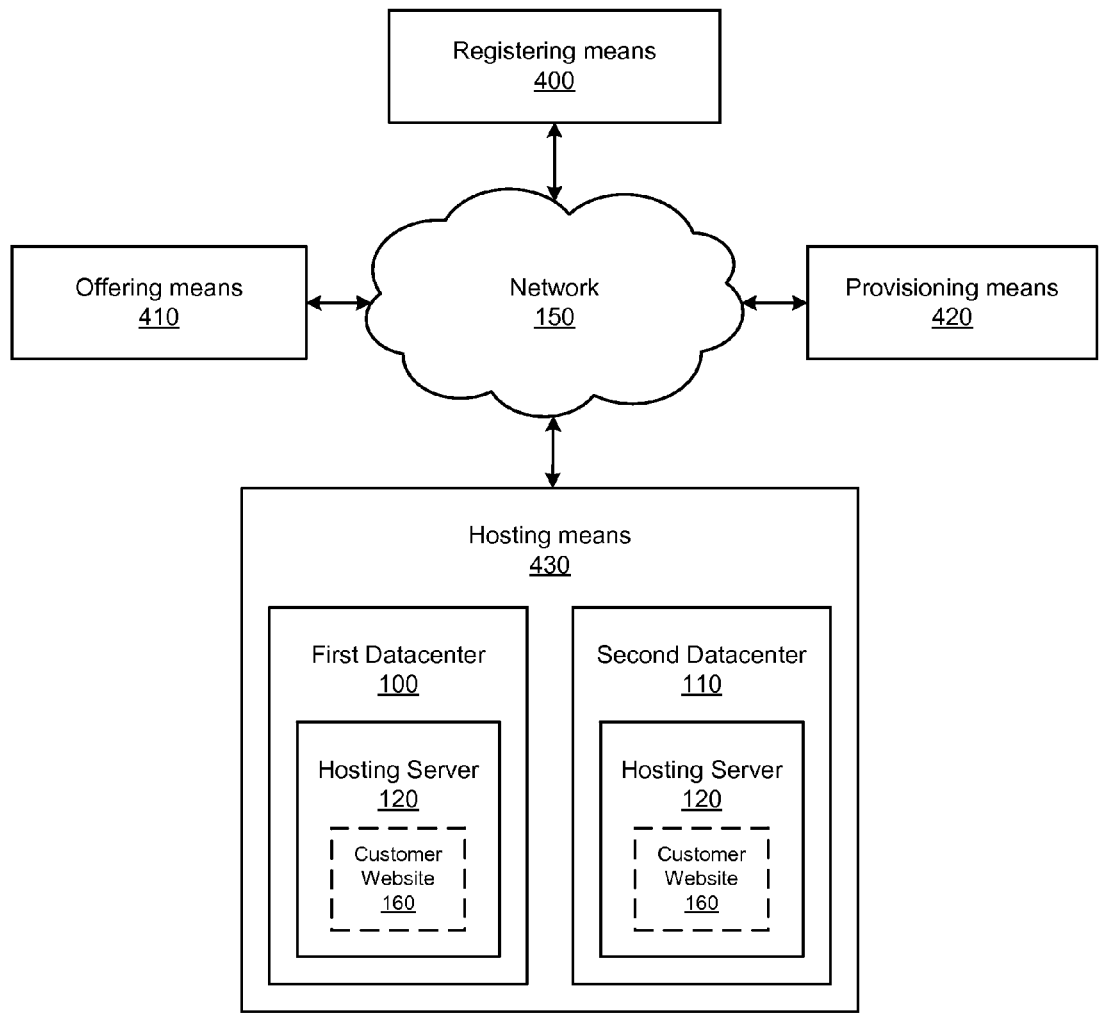
FIG. 4 illustrates a possible embodiment of a system for providing customer-selected solutions for multiple datacenter website hosting.

FIG. 4 illustrates another possible embodiment of a system for providing customer-selected solutions for multiple datacenter website hosting that may comprise means for registering 400 a domain name to a registrant, means for offering 410 to host at least one customer website 160 (that may resolve from the domain name) in a first datacenter 100, a second datacenter 110, or both, means for provisioning 420 (if the registrant selects hosting in both datacenters) at least one hosting server 120 in the first datacenter 100 and at least one hosting server 120 in the second datacenter 110 to host the customer website 160, means for hosting 430 the customer website 160 on the at least one hosting server 120 in the first datacenter 100 and the at least one hosting server 120 in said second datacenter 110, and a network 150 communicatively coupling the means for registering 400, means for offering 410, means for provisioning 420, and means for hosting 430.

The means for registering 400 a domain name to a registrant may comprise any domain name registration system known in the art or developed in the future including, but not limited to, a website-enabled domain name purchase and registration system, such as that described in detail above and/or may be available on GODADDY.COM's website. As a non-limiting example, it may comprise software and/or scripts containing instructions that, when executed by a server's microprocessor, cause the microprocessor to determine whether a requested or suggested domain name is available for registration and, if available, register the domain name to the registrant.

The means for offering 410 to host a customer website 160 may comprise any system known in the art or developed in the future for offering to host a website, such as that described in detail above and/or may be available on GODADDY.COM's website. As a non-limiting example, it may comprise the customer interaction server 140 and/or hosting services website 130 described in detail above, and/or any variation of the same. Alternatively, and as another non-limiting example, the offering means 410 may comprise a telephone-based system whereby domain name registrants are automatically and/or manually called and offered hosting services. Offers to host also may be made via email, instant messaging, and/or any other electronic messaging systems known in the art or developed in the future.

The means for provisioning 420 hosting servers 120 may comprise any system for provisioning servers known in the art or developed in the future including, but not limited to the imaging and/or scripting approaches, or any combination thereof. As a non-limiting example, it may comprise software and/or scripts containing instructions that, when executed by a microprocessor on a server or client, cause the microprocessor to provision at least one hosting server 120 in the first datacenter 100, at least one hosting server 120 in the second datacenter 110, and/or both as described in detail above.

The means for hosting 430 the customer website 160 may comprise any system for hosting a website known in the art or developed in the future including, but not limited to, the implementation of the at least one hosting server 120 in the first datacenter 100 and the least one hosting server 120 in said second datacenter 110 as described in detail above. Alternatively, any hosting configuration may be utilized including, but not limited to, systems offering virtual, dedicated, virtual-dedicated, grid, and/or cloud hosting solutions.

Figure 5:
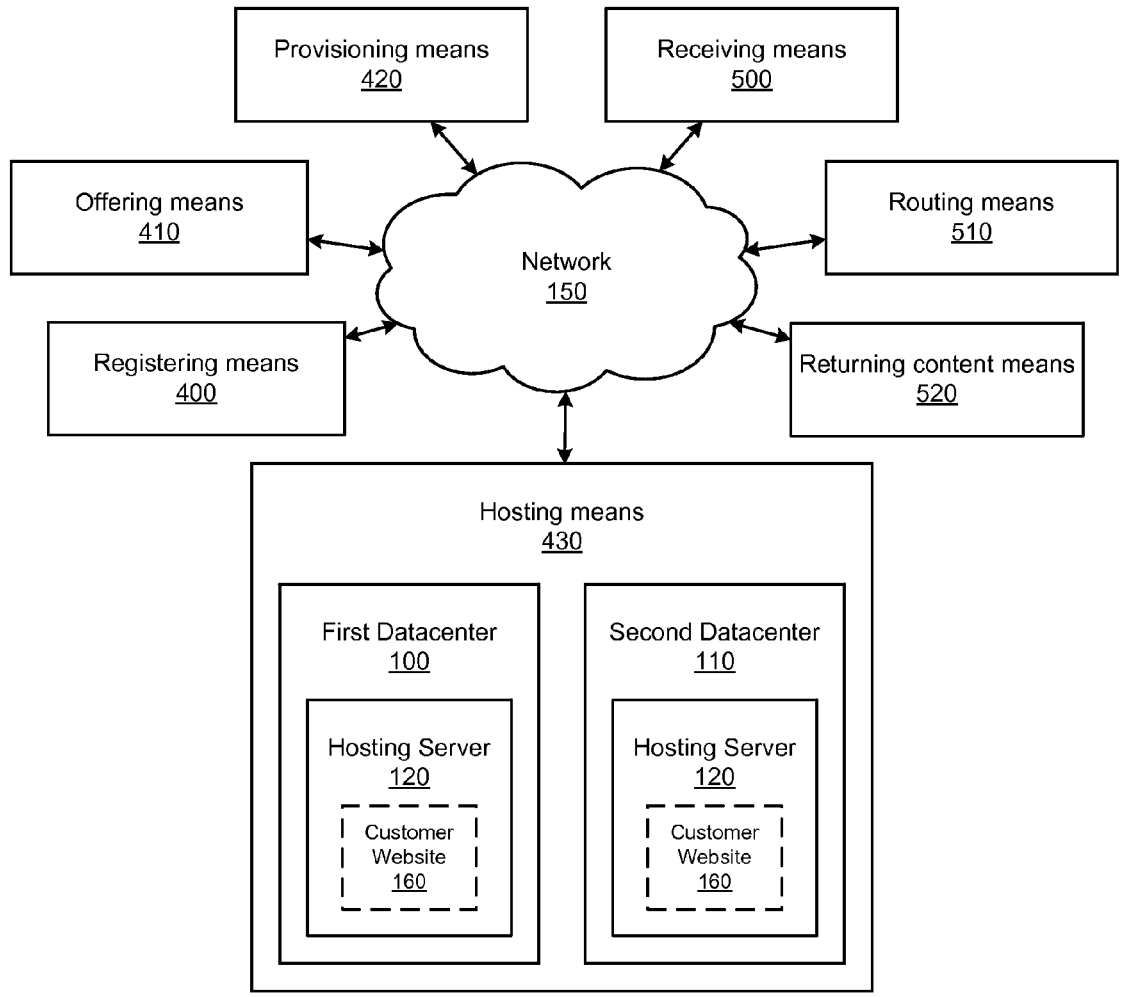
FIG. 5 illustrates a possible embodiment of a system for providing customer-selected solutions for multiple datacenter website hosting.

FIG. 5 illustrates an alternate embodiment of the system shown in FIG. 4, further comprising means for receiving 500 a request for a plurality of content from the customer website(s) 160, means for routing 510 the request to a responding datacenter (that may be selected by determining whether the request will receive a faster response from the first datacenter 100 or the second datacenter 110), and means for returning 520 content. Each of these means (500-520) may be communicatively coupled to the network 150 as described in detail above.

The means for receiving 500 a request for website content may comprise any system known in the art or developed in the future for receiving a website content request including, but not limited to software and/or scripts containing instructions that, when executed by a server's microprocessor (perhaps a hosting server 120 or routing server 300), cause the microprocessor to interpret an incoming content request and return the content to the requestor. The content request may be in any form known in the art or developed in the future including, but not limited to HTTP, File Transfer Protocol (FTP), and/or Transmission Control Protocol (TCP/IP).

The means for routing 510 the request to a responding datacenter may comprise software and/or scripts containing instructions that, when executed by a server's microprocessor (perhaps a hosting server 120 or a routing server 300), cause the microprocessor to determine whether the request will receive a faster response from a first datacenter 100 or a second datacenter 110. This may be accomplished by the routing server 300 described in detail above, or perhaps by similar functionality enabled on a hosting server 120 in a datacenter. And as illustrated in FIG. 6, one example embodiment of the routing means 510 may accomplish its task by further comprising means for determining 600 the geographic origin of the content request, and means for identifying 610 the responding datacenter by determining whether the first datacenter 100 or second datacenter 110 is in closest physical proximity to the geographic origin of said request.

The means for returning 520 content may comprise any system or method known in the art or developed in the future for returning requested website content. As a non-limiting example, the returning means 520 may comprise software and/or scripts containing instructions that, when executed by a server's microprocessor (perhaps a hosting server 120), cause the microprocessor to transmit the requested content to the requesting entity. Content may be transmitted, perhaps via the network 150, according to any data transmission protocol known in the art or developed in the future including, but not limited to file transfer protocol (FTP).

Viable data transfer methods can generally be classified in two categories: (1) "pull-based" data transfers where the receiver initiates a data transmission request; and (2) "push-based" data transfers where the sender initiates a data transmission request. Both types are expressly included in the embodiments illustrated herein, which also may include transparent data transfers over network file systems, explicit file transfers from dedicated file-transfer services like FTP or HTTP, distributed file transfers over peer-to-peer networks, file transfers over instant messaging systems, file transfers between computers and peripheral devices, and/or file transfers over direct modem or serial (null modem) links, such as XMODEM, YMODEM and ZMODEM. Data streaming technology also may be used to effectuate data transfer. A data stream may be, for example, a sequence of digitally encoded coherent signals (packets of data) used to transmit or receive information that is in transmission. Any data transfer protocol known in the art or developed in the future may be used including, but not limited to: (1) those used with TCP/IP (e.g., FTAM, FTP, HTTP, RCP, SFTP, SCP, or FASTCopy); (2) those used with UDP (e.g., TFTP, FSP, UFTP, or MFTP); (3) those used with direct modem connections; (4) HTTP streaming; (5) Tubular Data Stream Protocol (TDSP); (6) Stream Control Transmission Protocol (SCTP); and/or (7) Real Time Streaming Protocol (RTSP).

Figure 6:
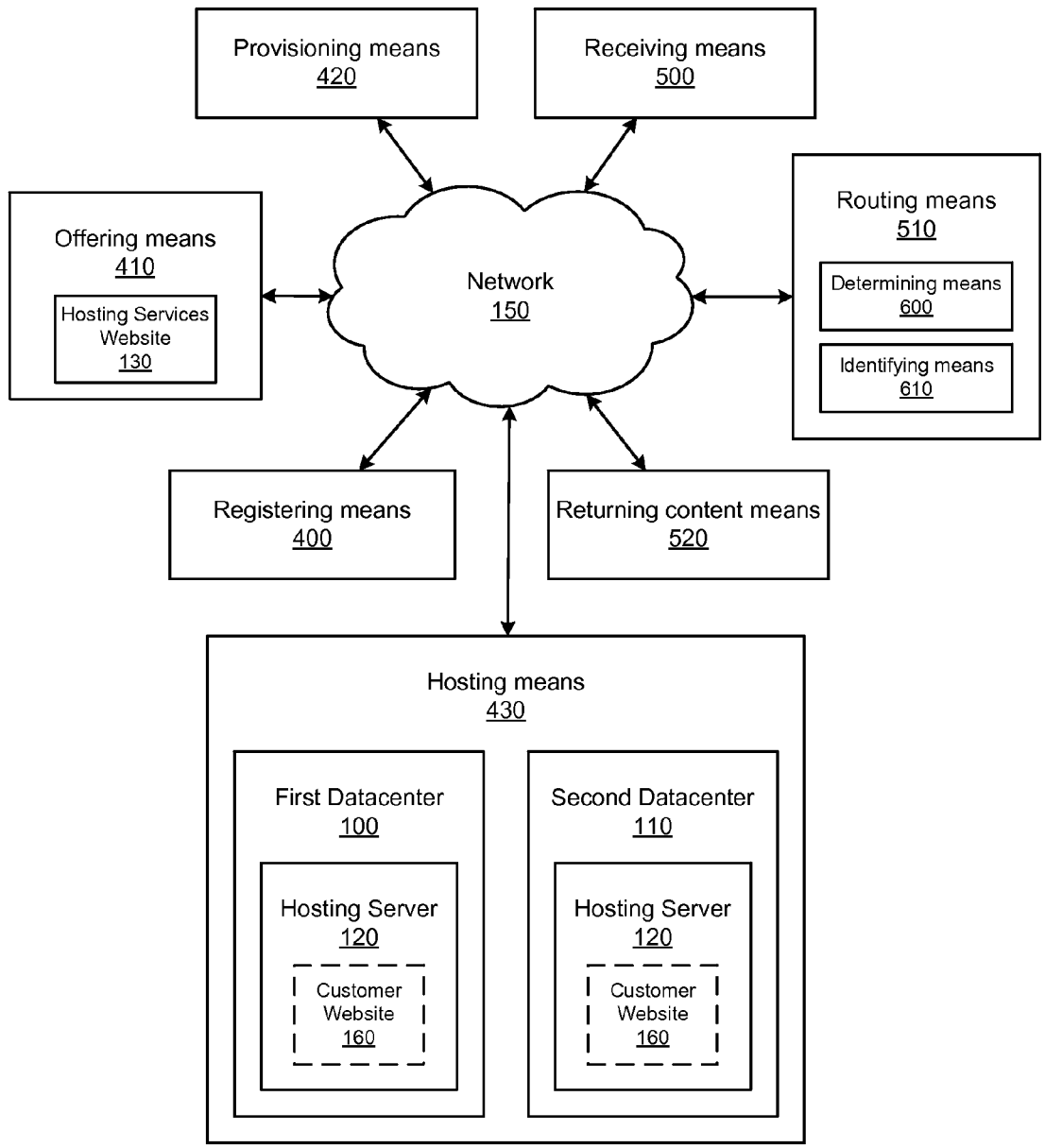
FIG. 6 illustrates a possible embodiment of a system for providing customer-selected solutions for multiple datacenter website hosting.

The illustrated configurations set forth in FIGS. 4-6 are not meant to limit the variety of configurations that may be implemented. Any configuration of means 400-430, 510, 520, 600, and 610 that accomplished the functionality set forth herein may be utilized. As non-limiting examples, the customer website 160 hosted in the first datacenter 100 may comprise the same content as the customer website 160 hosted in the second datacenter 110. Alternatively, different content may be hosted in each datacenter, resulting in the delivery of geographic-specific content. These options may allow the content provider to either have the same content delivered irrespective of geography, or tailor content based on the Internet user's location. For example, local datacenters may return content in a native language. Moreover, the means for registering 400, means for offering 410, means for provisioning 420, and means for hosting 430 (and all described embodiments of the same) may all reside on the same client, server, or other computing device. Alternatively, some (or all) of these means (400-430) may reside on separate clients, servers, and/or other computing devices.

Figure 7:
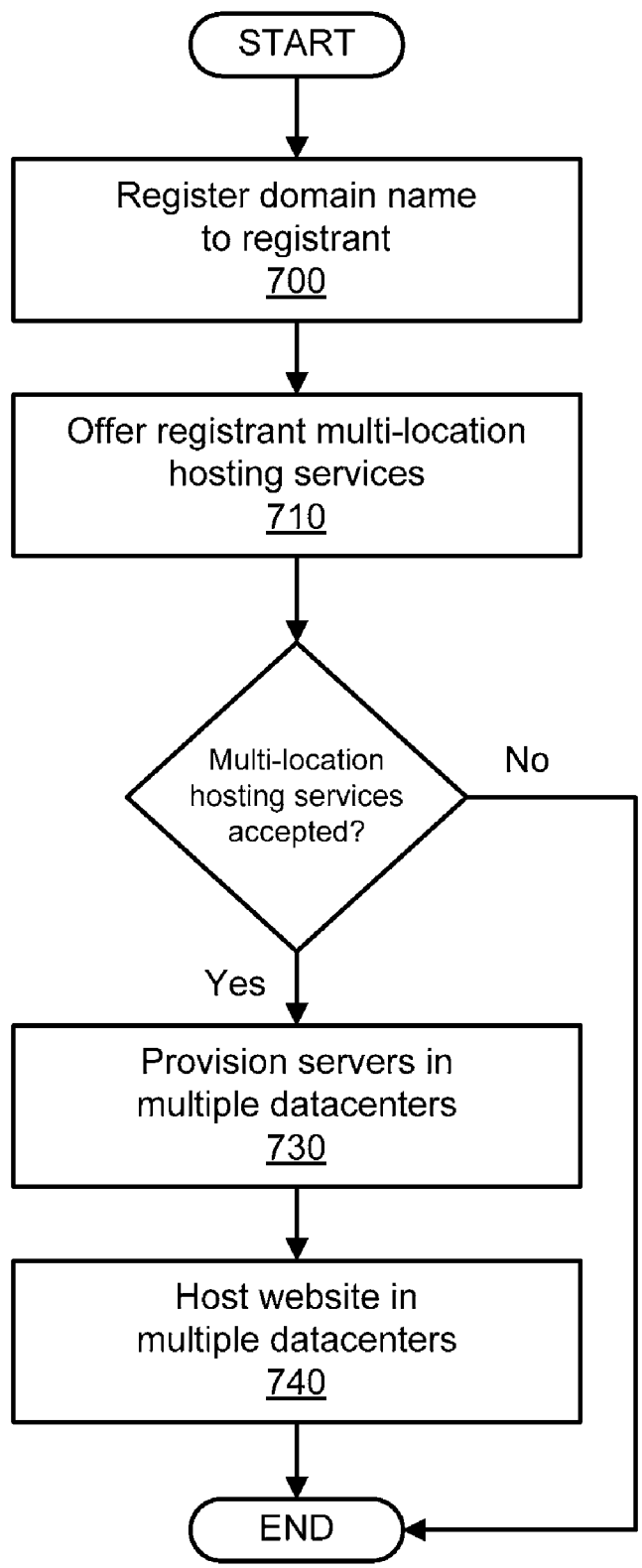
FIG. 7 is a flow diagram illustrating a possible embodiment of a method for providing customer-selected solutions for multiple datacenter website hosting.

Methods for Providing Customer-Selected Solutions for Multiple Datacenter Website Hosting As illustrated in FIG. 7, an example embodiment of a method for providing customer-selected solutions for multiple datacenter website hosting may comprise the steps of registering (perhaps via at least one customer interaction server 140) a domain name to a registrant (Step 700) and offering (perhaps via the at least one customer interaction server 140) to host at least one customer website 160 (that may resolve from the domain name) in a first datacenter 100, a second datacenter 110, or both datacenters (Step 710). If the registrant selects hosting the customer website(s) 160 in the first datacenter 100 and the second datacenter 110, the illustrated method also may comprise the steps of provisioning (perhaps by the customer interaction server 140) at least one hosting server 120 in the first datacenter 100 and at least one hosting server 120 in the second datacenter 110 to host the customer website(s) 160 (Step 730) and hosting the customer website(s) 160 on at least one hosting server 120 in the first datacenter 100 and at the least one hosting server 120 in the second datacenter 110 (Step 740).

Domain name registration (Step 700) may be accomplished by any domain name registration method known in the art or developed in the future including, but not limited to, the registering means 400 described above, or perhaps via a website-enabled domain name purchase and registration system, such as may be available on GODADDY.COM's website. Alternatively, domain name registration may be accomplished via human to human communication, perhaps via a telephone call or in-person meeting. Domain names may be registered by, as non-limiting examples, any individual or entity including, but not limited to a domain name registry, domain name registrar, hosting provider, and/or software application developer or distributor.

Once a domain name has been registered, the registrant (or any person or entity having control of the domain name) may be offered services for hosting at least one customer website 160 that may or may not resolve from the domain name (Step 710). This website hosting offer may be made in any manner known in the art or developed in the future for extending an offer including, but not limited to the offering means 410 described in detail above. As a further non-limiting example, this offer may be made via the at least one customer interaction server 140, perhaps by displaying an offer on a hosting services website 130 upon completion of domain name registration (Step 700). Alternatively, the customer interaction server 140 may send the offer via an electronic communication (e.g., email message, SMS message, and/or other text, video, or audio message) to the domain name registrant. The offer also may be accomplished via human to human communication, perhaps via a telephone call or in-person meeting. Irrespective of the offering method used, the offer itself may provide the domain name registrant with the option to host his customer website 160 in a first datacenter 100, a second datacenter 110, or both the first datacenter 100 and the second datacenter 110. FIG. 1 illustrates a possible embodiment of a hosting services website 130 providing such options.

If the offer is accepted—and the registrant selects the option of hosting the customer website(s) 160 in both the first datacenter 100 and the second datacenter 110—at least one hosting server 120 in both the first datacenter 100 and the second datacenter 110 may be provisioned to host the customer website 160 (Step 730). Hosting servers 120 may be provisioned, perhaps via the at least one customer interaction server 140 or the hosting servers 120 themselves, via any of the systems and/or methods of server provisioning described above including, but not limited to, the provisioning means 420. Once the hosting servers 120 have been provisioned, the customer website 160 may be hosted (Step 740) on at least one hosting server 120 in the first datacenter 100 and at least one hosting server 120 in the second datacenter 110. Hosting may be accomplished by any of the methods and/or systems known in the art or developed in the future including, but not limited to, those described in detail above, such as the hosting means 430.

Figure 8:
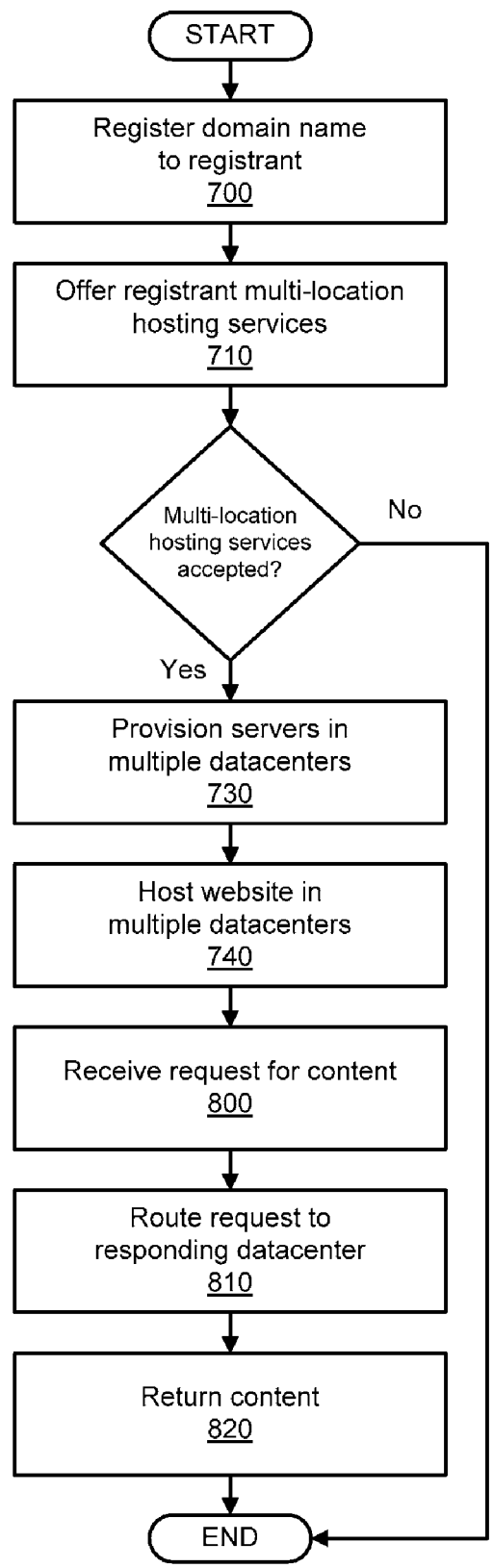
FIG. 8 is a flow diagram illustrating a possible embodiment of a method for providing customer-selected solutions for multiple datacenter website hosting.

FIG. 8 illustrates an alternate embodiment of the method illustrated in FIG. 7, further comprising the steps of receiving (perhaps via at least one routing server 300), a request for a plurality of content from the customer website(s) 160 (Step 800), routing the request (perhaps by a routing server 300) to a responding datacenter, which may be either the first datacenter 100 or said second datacenter 110, depending on which datacenter is determined to provide a quicker request response (the request may be routed to the quicker-responding datacenter) (Step 810), and returning the content to the requester, perhaps by a hosting server 120 in the responding datacenter (Step 820).

A content request may be received (Step 800), by any system or method known in the art or developed in the future for receiving a website content request including, but not limited to software and/or scripts containing instructions that, when executed by a server's microprocessor (perhaps a hosting server 120 or routing server 300), cause the microprocessor to interpret an incoming content request and return the content to the requestor. The content request may be in any form known in the art or developed in the future including, but not limited to HTTP, File Transfer Protocol (FTP), and/or Transmission Control Protocol (TCP/IP).

The content request then may be routed to a responding datacenter (Step 810). This step may be accomplished by any system or method known in the art or developed in the future for determining whether the first datacenter 100 or second datacenter 110 would provide a quicker request response and routing the request to the responding datacenter including, but not limited to, the routing server 300 and/or routing means 510 described in detail above. The routing server 300 may be configured to accomplish this step by installing the above-described software and/or scripts on the routing server 300. The quickest response time may be a function of geographical proximity, or any other factor contributing to delay in response time, such as system demand.

Figure 9:
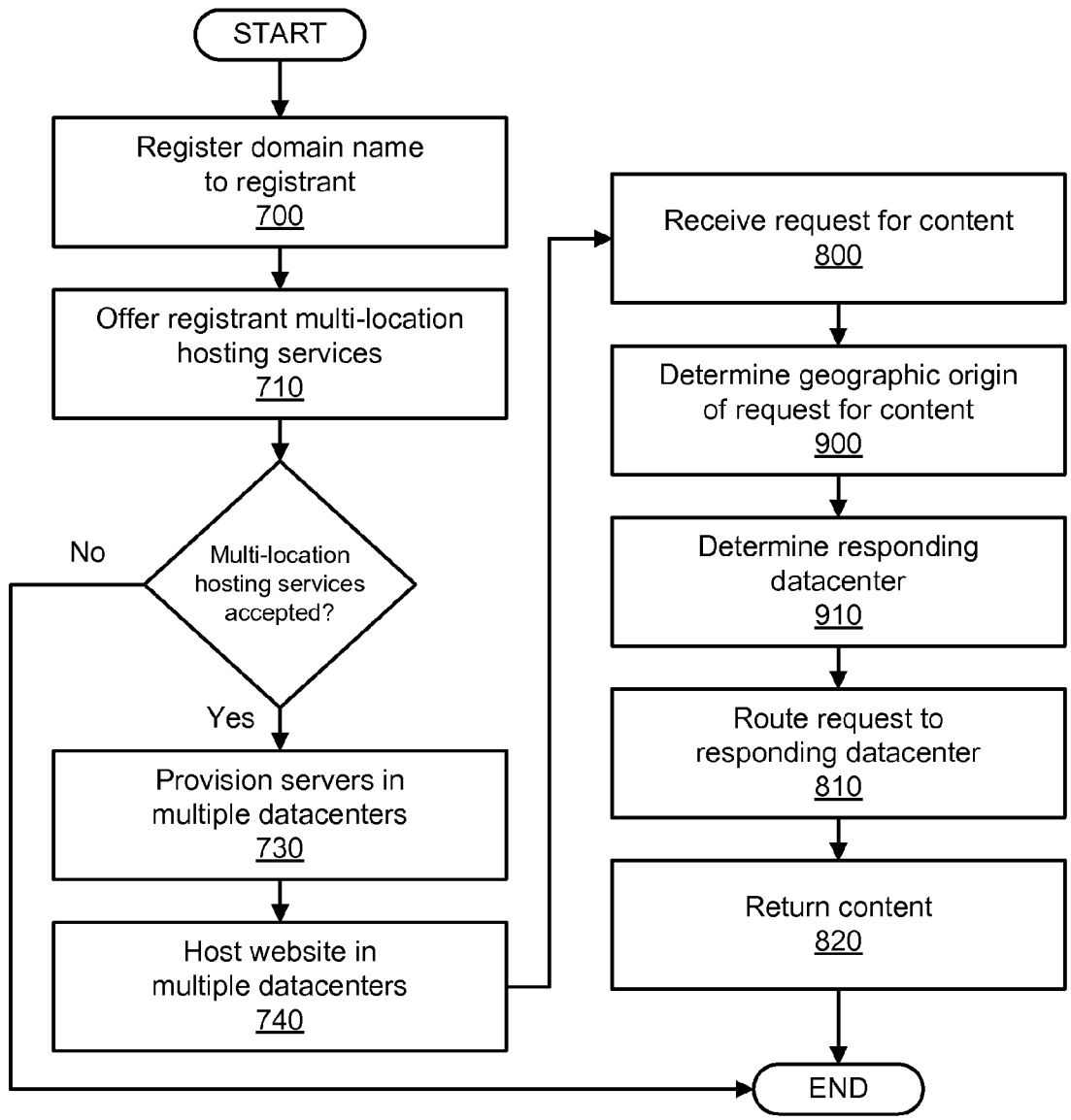
FIG. 9 is a flow diagram illustrating a possible embodiment of a method for providing customer-selected solutions for multiple datacenter website hosting.

As a non-limiting example illustrated in FIG. 9, the routing step (Step 810) also may be accomplished by determining the geographic origin of the request (Step 900), determining whether the first datacenter 100 or second datacenter 110 is in closest physical proximity to the geographic origin of the request (Step 910), and routing the request to the closest datacenter (Step 810). As a non-limiting example, the geographic origin of the request may be obtained by identifying the IP address of a client making an HTTP request (the IP address may be in the HTTP request itself) and comparing the IP address against one of the many available geolocation databases, such as those provided by GEOBYTES or IP2LOCATION. This physical location then may be compared to the known locations of the first datacenter 100 and second datacenter 110 and the content request may be routed to the closest datacenter (i.e., responding datacenter). Routing step 810 also may be implemented by any system or method of geographical load balancing known in the art or developed in the future including, but not limited to, the implementation of a Content Delivery Network (CDN) for web acceleration, such as may be offered commercially by AKAMAI, LIMELIGHT, and/or CDNETWORKS.

Figure 10:
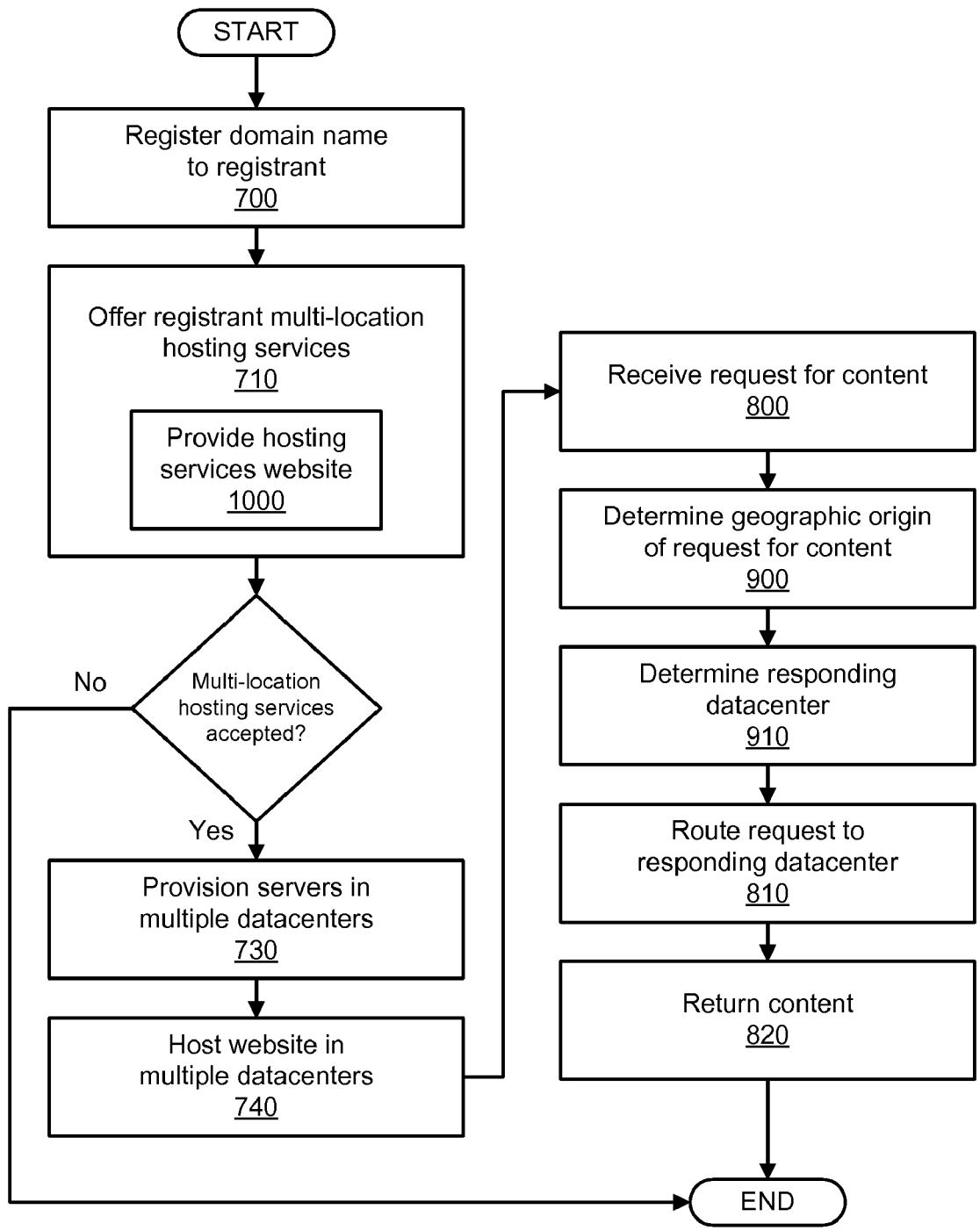
FIG. 10 is a flow diagram illustrating a possible embodiment of a method for providing customer-selected solutions for multiple datacenter website hosting.

FIG. 10 illustrates a variation of the method illustrated in FIG. 9, wherein offering step 710 is accomplished by providing a hosting services website 130 (Step 1000) as described in detail above.

Figure 11:
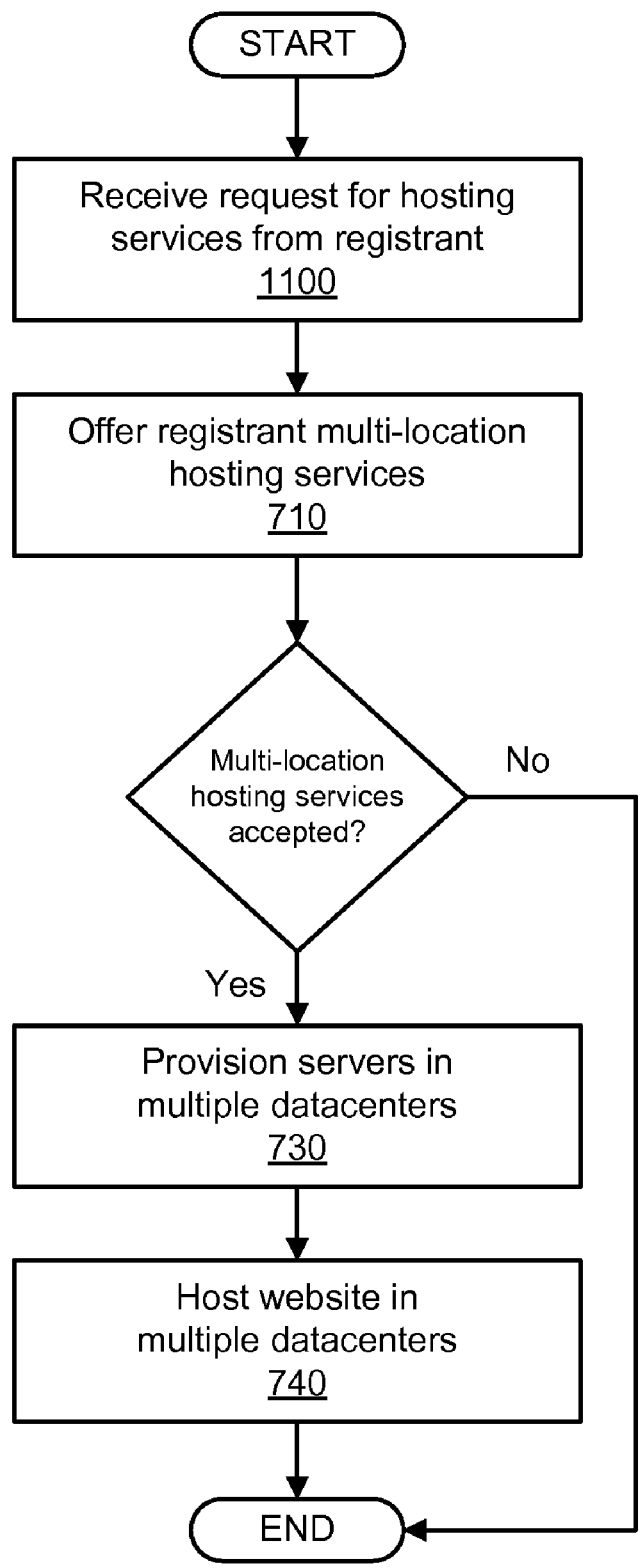
FIG. 11 is a flow diagram illustrating a possible embodiment of a method for providing customer-selected solutions for multiple datacenter website hosting.
Figure 12:
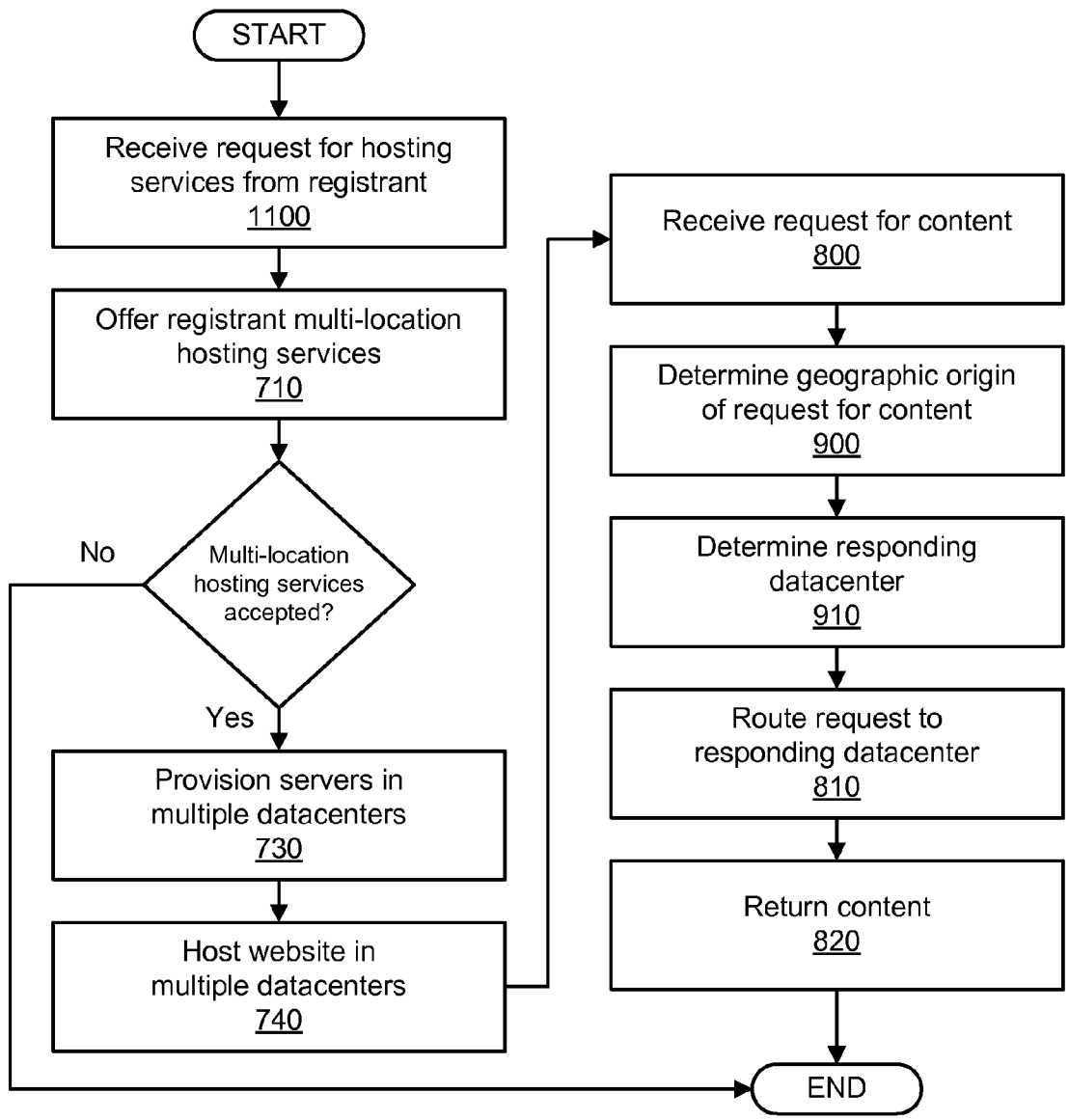
FIG. 12 is a flow diagram illustrating a possible embodiment of a method for providing customer-selected solutions for multiple datacenter website hosting.

FIGS. 11 and 12 illustrate a method for providing customer-selected solutions for multiple datacenter website hosting similar to those illustrated in FIGS. 7 and 9, wherein the domain name registration step (700) has been replaced with the step of receiving (perhaps by at least one customer interaction server 140) a request for hosting services from a domain name registrant (Step 1100). Whereas the methods illustrated in FIGS. 7-10 may be performed by a domain name registrar as part of the domain name registration process, these illustrated embodiments (FIGS. 11 and 12) may provide tools for non-domain name registering entities to provide the services described herein. For example, a domain name registrant may register a domain name with his registrar, and then contact a hosting provider (that may not also be a domain name registrar) to request hosting services (Step 1100). The hosting provider then may implement the disclosed methods by following the above described steps (710-910).

An Example Use of Systems and Methods for Providing Customer-Selected Solutions for Multiple Datacenter Website Hosting The systems and methods described herein may be used in many ways including to, among other things, allow domain name registrants and/or hosting service customers to select the geographic location where their website(s) 160 may be hosted, perhaps to optimize request response time, or to geographically customize website 160 content.

As a non-limiting example of how such systems and methods may be used, an Arizona-based business owner may, via the browser on his laptop computer that may be wirelessly connected to the Internet (i.e., the network 150), navigate to a domain name registrar and hosting provider's website 130, such as (GODADDY.COM's website) and register a domain name (e.g., "widgets.com") (Step 700). During the registration process, the domain name registrar then may offer to host any website 160 that the registrant may want to associate with the domain name "widgets.com" (Step 710). The offer may appear as a pop up window on the hosting services website 130 that asks the registrant to select where he would like his website hosted: in a datacenter located in North America, Europe, or both.

Because the registrant's business (and most of his customers) may be located in Arizona, but he also may have a niche market and customer base in Germany (that requires a German language website), he may select the "both" option, wishing to host his website 160 in both North America and Europe. Software running on the customer interaction server 140 (that hosts the hosting services website 130) may then provision a hosting server 120 in a North American datacenter and another hosting server 120 in a European datacenter to host the customer's website 160 (Step 730). Once server provisioning is complete, the registrant may upload website 160 content to each hosting server 120, with English-language content being hosted in the North American datacenter and German-language content being hosted in the European datacenter (Step 740).

When an HTTP request seeking the website located at www.widgets.com is received by a routing server 300 (Step 800), software running on the routing server 300 may determine (by analyzing the HTTP request) the IP address of the requesting client. The IP address may then be compared against an online geolocation database, such as that provided by GEOBYTES, which maps IP address to geographic location. If the geographic location is determined to be in Germany, the routing server 300 may route the HTTP request to the hosting server 120 in the European datacenter (Step 810), which then may respond to the HTTP request with German-language website 160 content.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The invention claimed is:

1. A system, comprising:
    A) a first datacenter located in a first geographic location, said first datacenter comprising at least one hosting server;
    B) a second datacenter located in a second geographic location, said second datacenter comprising at least one hosting server;
    C) a hosting services website hosted on at least one customer interaction server, said hosting services website configured to offer a registrant of a domain name a choice of website hosting options comprising:
        i) hosting at least one customer website resolving from said domain name in said first datacenter;
        ii) hosting said at least one customer website in said second datacenter; and
        iii) hosting said at least one customer website in both said first datacenter and said second datacenter, wherein at least one of said at least one customer interaction server is further configured to, if said registrant selects hosting said at least one customer website in both said first datacenter and said second datacenter, provision said at least one hosting server in said first datacenter and said at least one hosting server in said second datacenter to host said at least one customer website;
    D) a routing server communicatively coupled to said network, said routing server configured to:
        i) receive a request for a plurality of said customer website's content; and
        ii) route said request to a responding datacenter selected from the group consisting of said first datacenter and said second datacenter by determining whether said request will receive a faster response from said first datacenter or said second datacenter; and
    E) a network communicatively coupling said first datacenter, said second datacenter, said routing server, and said customer interaction server.

2. The system of claim 1 wherein said first datacenter is located in a first geographic location and said second datacenter is located in a second geographic location.

3. The system of claim 2, wherein said first geographic location comprises North America and said second geographic location comprises Europe.

4. The system of claim 2, wherein said first geographic location comprises North America and said second geographic location comprises Asia.

5. The system of claim 1, wherein said routing server is further configured to route said request to said responding datacenter by: (i) determining a geographic origin of said request; (ii) identifying said responding datacenter by determining whether said first datacenter or said second datacenter is in closest physical proximity to said geographic origin of said request; and (iii) routing said request to said responding datacenter.

6. The system of claim 5, wherein said at least one customer website hosted in said first datacenter comprises different content than said at least one customer website hosted in said second datacenter.

7. The system of claim 5, wherein said at least one customer website hosted in said first datacenter comprises the same content as said at least one customer website hosted in said second datacenter.

8. A system, comprising:
    A) means for registering a domain name to a registrant;
    B) means for offering said registrant a choice of website hosting options comprising:
        i) hosting at least one customer website resolving from said domain name in a first datacenter located in a first geographic location;
        ii) hosting said at least one customer website in a second datacenter located in a second geographic location; and
        iii) hosting said at least one customer website in both said first datacenter and said second datacenter;
    C) means for provisioning, if said registrant selects hosting said at least one customer website in both said first datacenter and said second datacenter, at least one hosting server in said first datacenter and at least one hosting server in said second datacenter to host said at least one customer website;
    D) means for hosting said at least one customer website on said at least one hosting server in said first datacenter and at said least one hosting server in said second datacenter;
    E) means for receiving a request for a plurality of said at least one customer website's content;
    F) means for routing said request to a responding datacenter selected by determining whether said request will receive a faster response from said first datacenter or said second datacenter;
    G) means for returning said plurality of said at least one customer website's content from said responding datacenter; and
    H) a network communicatively coupling said means for registering, said means for offering, said means for provisioning, said means for receiving, said means for routing, said means for returning, said first datacenter, said second datacenter, and said means for hosting.

9. The system of claim 8, wherein said first geographic location comprises North America and said second geographic location comprises Europe.

10. The system of claim 8, wherein said first geographic location comprises North America and said second geographic location comprises Asia.

11. The system of claim 8, wherein said means for routing further comprises:
  i) means for determining a geographic origin of said request;
  ii) means for identifying said responding datacenter by determining whether said first datacenter or said second datacenter is in closest physical proximity to said geographic origin of said request; and
  iii) means for routing said request to said responding datacenter.

12. The system of claim 11, wherein said at least one customer website hosted in said first datacenter comprises the same content as said at least one customer website hosted in said second datacenter.

13. The system of claim 11, wherein said at least one customer website hosted in said first datacenter comprises different content than said at least one customer website hosted in said second datacenter.

14. The system of claim 11, wherein said means for offering B) comprises a hosting services website comprising means for said registrant to select hosting said at least one customer website in said first datacenter and said second datacenter.

15. The system of claim 8, wherein said means for registering, said means for offering, said means for provisioning, and said means for hosting comprise the same server.

16. The system of claim 8, wherein said means for registering, said means for offering, said means for provisioning, and said means for hosting comprise a plurality of different servers.

* * * * *